Oct. 16, 1928.

W. B. EDDISON 1,687,549

OIL BURNING HEATING SYSTEM

Filed July 10, 1923

W. B. EDDISON 1,687,549

OIL BURNING HEATING SYSTEM

Filed July 10, 1923

INVENTOR
William Barton Eddison
BY
his ATTORNEY

Oct. 16, 1928.

W. B. EDDISON 1,687,549

OIL BURNING HEATING SYSTEM

Filed July 10, 1923  6 Sheets-Sheet 3

INVENTOR
William Barton Eddison
BY
his ATTORNEY

Oct. 16, 1928.  1,687,549

W. B. EDDISON

OIL BURNING HEATING SYSTEM

Filed July 10, 1923   6 Sheets-Sheet 5

INVENTOR
William Barton Eddison
BY
his ATTORNEY

Patented Oct. 16, 1928.

1,687,549

UNITED STATES PATENT OFFICE.

WILLIAM BARTON EDDISON, OF IRVINGTON, NEW YORK.

OIL-BURNING HEATING SYSTEM.

Application filed July 10, 1923. Serial No. 650,572.

This invention relates to heating systems and aims to provide a safe and economical oil-burning heating system, and, in particular, one which is simple and self-regulating, and so adapted for use in heating dwelling houses.

Other objects and advantages of the invention are hereinafter explained.

A heating system embodying the invention, in an approved form, comprises an oil burner, and a heat engine, operated by a part of the heat generated in the burner, for supplying fuel oil and air to the burner at rates bearing a predetermined ratio to each other.

The system is intrinsically safe, for, since fuel is supplied to the burner by an engine operated by heat produced in the burner, an accidental stoppage of combustion in the burner necessarily stops the supply of fuel to the burner.

The system is economical because the rates of fuel supply and air supply are accurately proportioned so that complete combustion of the fuel is assured without the waste involved in heating large amounts of excess air.

A further economy results from the fact that the burner is operated continuously and that, as no natural draft is used, the boiler is not cooled by a current of air during times of minimum combustion in the burner.

While the invention in its broadest aspect is not limited to the use of a burner or other apparatus of any particular construction, an important part of the invention consists in a novel form of burner and other novel apparatus which are of value in providing a practical and efficient system embodying the invention. Such a system of apparatus is illustrated in the accompanying drawings, in which:—

The heating system illustrated in the drawings includes heat-utilizing means, such as a boiler 10, an oil burner 11 located in a closed fire box 12 under the boiler, a hot air engine 13 which is operated by a part of the heat generated in the burner 11 and drives positive pumping apparatus 14, and a blower 15, which supply fuel and air to the burner at rates which bear a predetermined ratio to each other.

The boiler 10, shown in the drawings, is of a type commonly used in house heating to supply steam or hot water to radiators, not shown in the drawings. The fire box 12 is completely closed except for the openings necessary to admit the various pipes hereinafter mentioned. It follows that no air is admitted to the fire box or to the space within the boiler except such as is supplied to the burner in the manner hereinafter described.

Provision is made for several distinct stages of combustion. The first stage of combustion is used continuously, while the other three stages are used when necessary to supply the heat required in the house which is heated by the boiler 10.

Figures 2, 3:
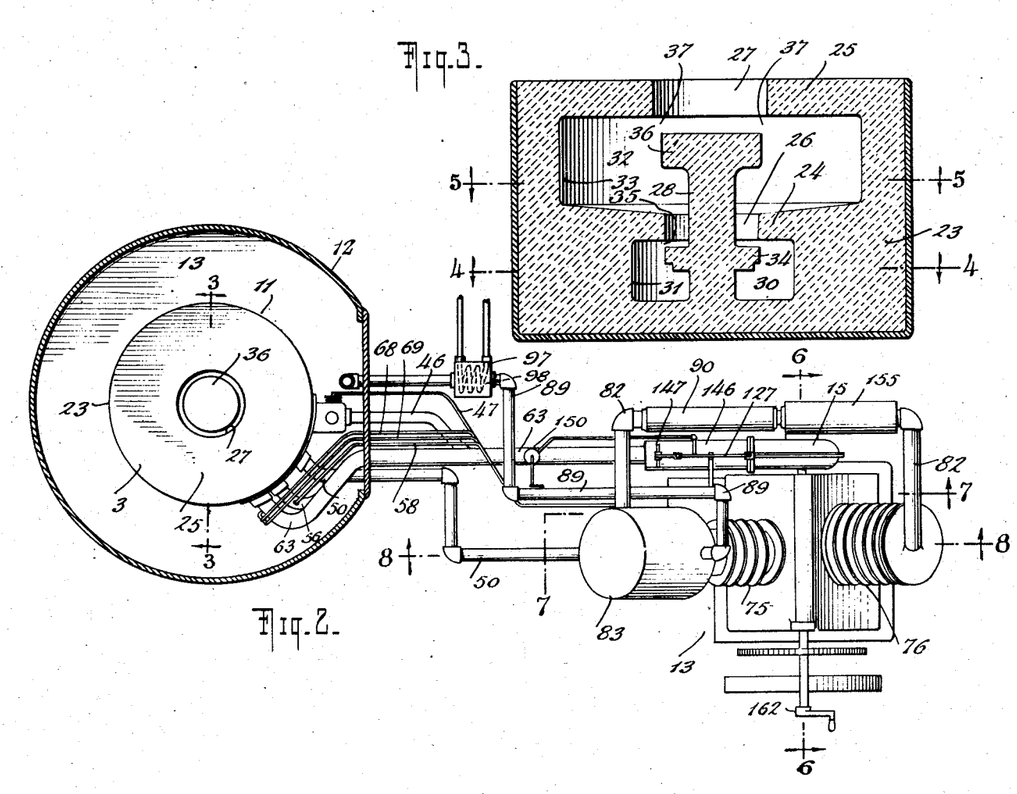
Fig. 2 is a top view of the system showing the furnace casing section on the line 2—2 of Fig. 1.
Fig. 3 is an enlarged sectional elevation of the main burner taken on the line 3—3 of Fig. 2.

The burner 11 provides a series of communicating combustion spaces including a primary combustion space 41 for the first stage of combustion, a secondary space 30 for the second stage of combustion, and tertiary space 32 for the third and fourth stages of combustion.

The secondary and tertiary spaces are contained in a common body 23 of refractory material and are separated by a horizontal flange 24. A horizontal flange 25 at the top of the body 23 and the flange 24 contain central passages 26 and 27. A column 28 extends from the bottom of the lower combustion space 30 through the passage 26 into the upper combustion space 32. An external flange 34 on the column 28 cooperates with the flange 24 to provide a constricted passage 35 between the secondary and tertiary combustion spaces, while a similar flange 36 on the column cooperates with the flange 25 to form a constricted outlet passage 37 for the tertiary combustion space 32.

Figure 4:
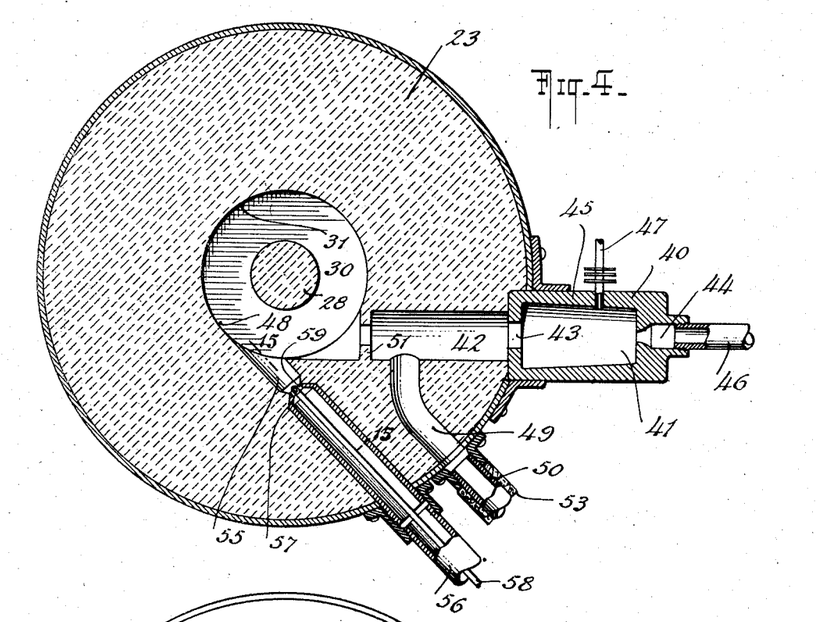
Fig. 4 is a horizontal section of the main burner and the pilot burner taken on the line 4—4 of Fig. 3.
Figure 5:
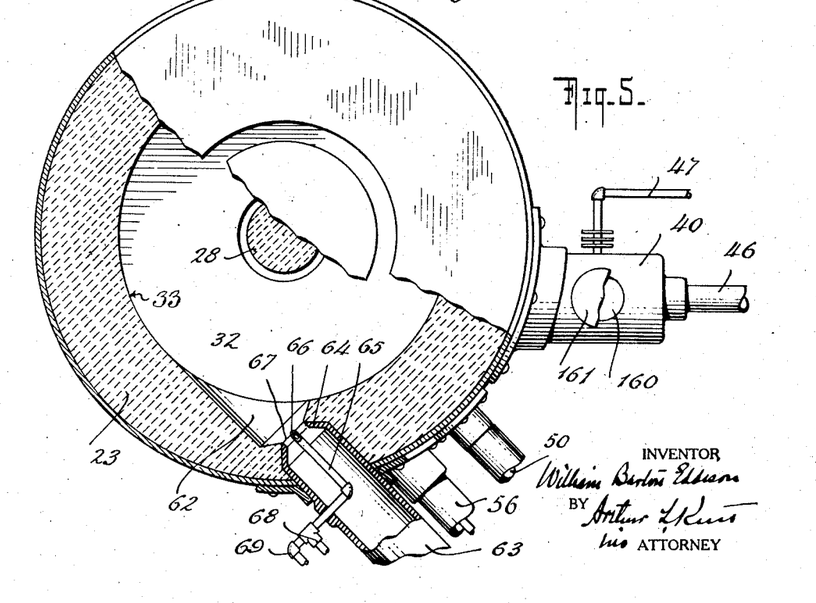
Fig. 5 is a top view of the main burner and the pilot burner, the main burner being partly sectioned on the line 5—5 of Fig. 3.

The primary combustion space 41 is contained in a body 40 which is secured to the body 23. The primary combustion space 41 communicates with the secondary combustion space 30 through a passage 42 extending through the body 23 and entering the secondary combustion space 30 in a tangential direction. The primary combustion space 41 has the form of a horizontal cylindrical tunnel with a constricted outlet 43 at its inner end, and an inwardly tapering air inlet nozzle 44 at its outer end. The side wall 45 of the primary combustion space is approximately cylindrical but tapers outwardly to some extent toward the outlet end of the space.

Fuel and air for the first stage of combustion in the burner 11 are supplied to the primary combustion space 41. The air is supplied through the conduit 46 communicating with the nozzle 44. Liquid fuel is supplied through a conduit 47 which enters the side wall 45 a little to one side of the top so that the fuel drips or flows down the inside of the side wall 45.

The air, which is forced in through the nozzle 44, flows toward the outlet 43 and also forms back eddy currents along the side wall 45. These eddy currents flow over the sheet of fuel which is dripping down the wall 45 and vaporize and mix with the fuel. The greater part of the fuel is burned in the combustion space 41 and the remainder of the fuel is vaporized and mixed with air in this space so that a flame issues from the opening 43 and extends into the passage 42. Hot products of combustion pass through this passage 42 into the secondary combustion space 30, heating the walls of this space, and especially the portion 48 of its side wall 31, which is directly opposite the passage 42. A portion of the hot products of combustion from the primary combustion space 41 passes into a passage 49 which branches from the passage 42 and communicates with a pipe 50. This portion of the products of combustion is utilized to operate the hot air engine as hereinafter explained. In order that a portion of the hot products sufficient for this purpose may pass into the passage 49, a partial obstruction 51 is placed in the passage 42 near its inner end.

Figures 12, 13, 14, 15:
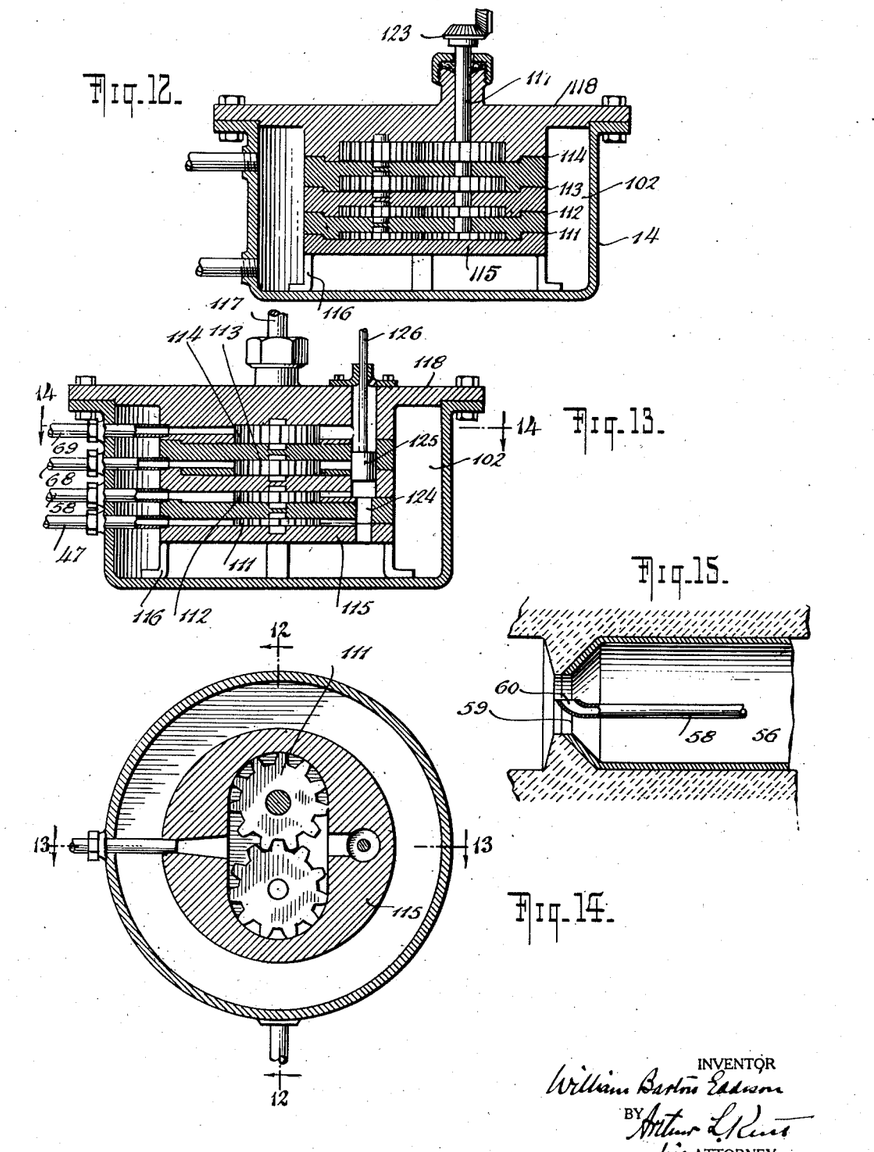
Fig. 12 is an enlarged sectional elevation of the fuel feed pump sectioned on the line 12—12 of Fig. 14.
Fig. 13 is a vertical section of the fuel feed pump taken on the line 13—13 of Fig. 14.
Fig. 14 is a horizontal section of the pump taken on the line 14—14 of Fig. 13.
Fig. 15 is a fragmentary vertical section on the line 15—15 of Fig. 4 showing the second stage fuel and air supply tubes.

Fuel and air for the second stage of combustion in the burner 11 are supplied to the secondary combustion space 30. They enter through a passage 55 extending through the body 23, and entering the secondary combustion space 30 in a tangential direction and at a point immediately adjacent to the portion 48 of the wall 31 which is heated by the first stage of combustion. The air is supplied through a conduit 56 which extends into the passage 55 and terminates in a tapered nozzle 57 near the inner end of this passage. Fuel is supplied through a pipe 58 which enters the body 23 within the air pipe 56 and terminates in the opening 59 of the nozzle 57. As best seen in Fig. 15, the end of the fuel pipe 58 is turned up so as to provide a horizontal upwardly directed fuel outlet opening 60 located in the opening 59 of the air nozzle.

When the second stage of combustion is used, the air, which is supplied through the pipe 56, passes rapidly through the opening 59 and picks up fuel which is welling up in the opening 60. The fuel which is thus mixed with the air is ignited when it strikes the heated portion 48 of the wall 31. Owing to the tangential arrangement of the passages 42 and 55, the fuel and air which enter the combustion space 30 through the passage 55 swirl about in the space 30 and become thoroughly mixed. The constricted outlet 35 of the secondary combustion space tends to retain the fuel and air in this space until they are thoroughly mixed, and until a partial combustion has taken place. As the result, hot products of combustion and flame pass from the secondary combustion space 30 into the tertiary combustion space 32 through the passage 35. The hot gases and flame are directed outwardly by the flange 36 of the column 28, and as the result they heat the side wall 33 of the tertiary combustion space 32 above the ignition temperature of the fuel. The combustion is completed or nearly completed in the tertiary combustion space 32 and hot gases issue from the passage 37 and pass upwardly within the boiler 10, supplying heat to the boiler.

Fuel and air for the third and fourth stages of combustion are supplied to the tertiary combustion space 32. They enter through a passage 62 which extends through the body 23 and enters the tertiary combustion space 32 in a tangential direction. The air is supplied through a pipe 63 terminating in a nozzle 64, and the fuel enters through a pipe 65 having at its end a horizontal discharge opening 66 located in the opening 67 of the air nozzle 64. The fuel pipe 65 communicates with two supply pipes 68 and 69, through each of which fuel may be supplied at a predetermined rate.

When the third stage of combustion is used, air is supplied through the pipe 63, and fuel is supplied to the pipe 65 through the pipe 68. The air carries the fuel into the tertiary combustion space 32 where the fuel is ignited by the hot side wall 33. The fuel and air swirl about in the space 32 and become thoroughly mixed. Partial combustion of the fuel takes place in the space 32 so that both hot products of combustion and flame pass out of the burner to heat the boiler 10.

When the fourth stage of combustion is used, fuel is supplied to the pipe 65 through the pipe 69 as well as through the pipe 68 and additional air is supplied through the pipe 63. The result is increased combustion in the tertiary combustion space 32 and increased combustion above the burner.

The burner is very economical in operation because the rate at which the fuel is supplied to each of the combustion spaces is so proportioned to the size of the space that a complete vaporization of the fuel takes place therein. Furthermore, during each stage of combustion the combustion spaces to which fuel is supplied are used to their full capacity, with the single exception of the tertiary combustion space during the third stage of combustion. It follows that when each combustion space is in use, its walls are so heated by the combustion which occurs in it that rapid and efficient vaporization of the fuel takes place.

Each stage of combustion supplies heat for igniting the fuel supplied to the combustion space for the next stage of combustion so that, as the first stage of combustion is operated continuously, no ignition means is necessary to operate the burner at any desired stage of combustion. Furthermore, the staging of the combustion greatly facilitates accurate proportioning of the fuel and air supplied.

A further advantage of the burner which has been described lies in the fact that it is comparatively noiseless even when in full operation. This I believe to be due to the thoroughness with which the fuel vapors and air are mixed by their swirling motion in the annular combustion spaces 30 and 32.

In order that the burner may be operated successfully, means must be provided for furnishing a continuous supply of fuel and air for the first stage of combustion at constant and properly proportioned rates, and for supplying fuel and air at predetermined rates for the other stages of combustion, whenever required. In accordance with the present invention, the apparatus for supplying fuel and air at predetermined rates are driven by a heat engine operated by a portion of the heat generated in the primary combustion space. While any type of heat engine may be used for this purpose, I have found that, for domestic use, a hot air engine is desirable because it is capable of operating continuously over long periods without attention.

Figure 6:
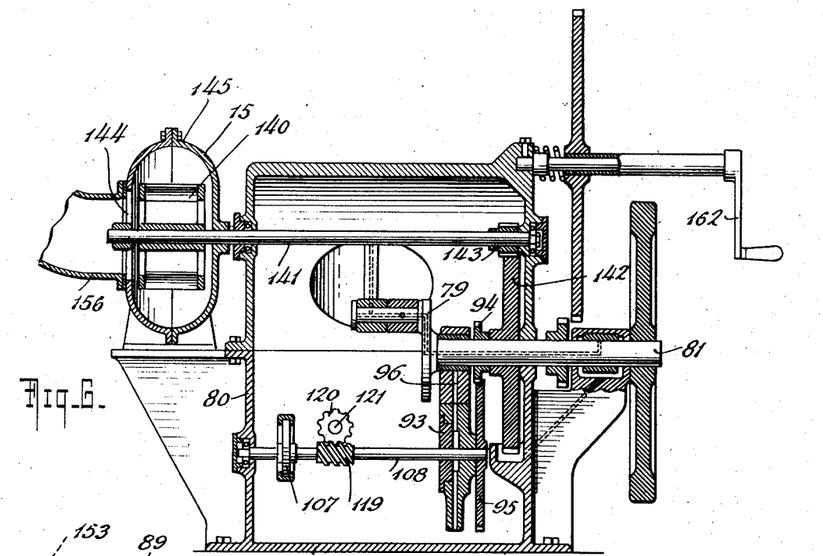
Fig. 6 is an enlarged transverse section of the engine taken on the line 6—6 of Fig. 2.
Figure 7:
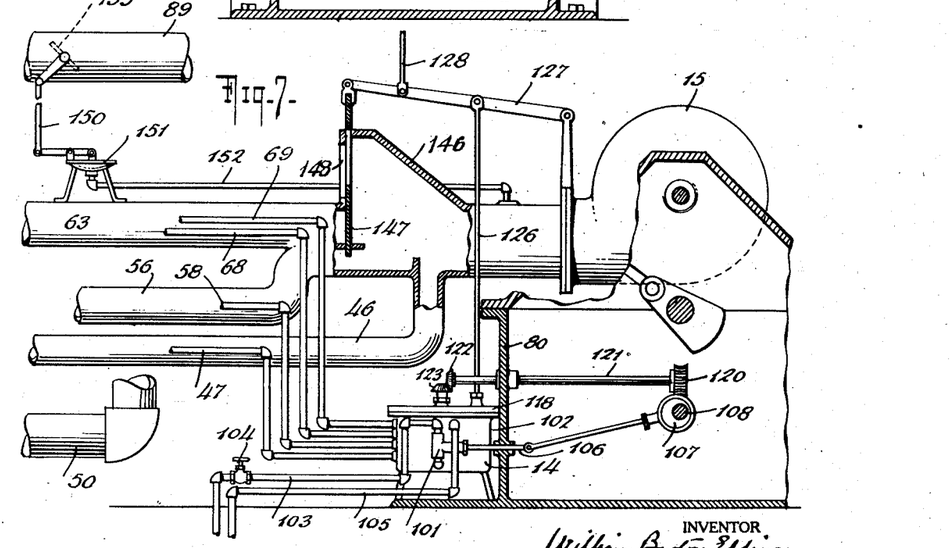
Fig. 7 is an enlarged side view of the engine and the apparatus associated with it with parts broken away and with the crank case of the engine sectioned on the line 7—7 of Fig. 2.

The hot air engine 13 illustrated in the drawings is similar in principle to the well-known Rider hot air engine. The relative size of the engine 13, and its distance from the burner 11, are somewhat exaggerated in the drawings, for the sake of clearness. The engine 13 differs from the Rider engine in that its hot cylinder 75 and its cold cylinder 76 are located with their axes at an angle of about 100° so that their pistons 77, 78 may be made to operate in properly timed relation by connecting them to a common crank 79. A further difference from the Rider engine consists in mounting both the cylinders on a closed crank case 80 into which the main shaft 81 of the engine extends.

The air which surges back and forth between the hot and cold cylinders of the engine through a conduit 82 is heated, on its entrance to the hot cylinder 75, by means of a heater 83. This heater includes a closed casing 84 secured to the outer end of the hot cylinder and containing a cylindrical baffle 85 around which the air passes on entering the casing 84 through an opening 86 with which one end of the conduit 82 communicates. An insulated casing 87 surrounds the casing 84 and provides a chamber 88 into which hot products of combustion from the primary combustion space 41 are led through the pipe 50. This pipe is covered with insulating material 53 to prevent loss of heat. These gases, after circulating around the casing 84, are led back into the fire box 12 through a pipe 89, so that any heat remaining in them may be utilized to assist the heating of the boiler 10.

Figure 1:
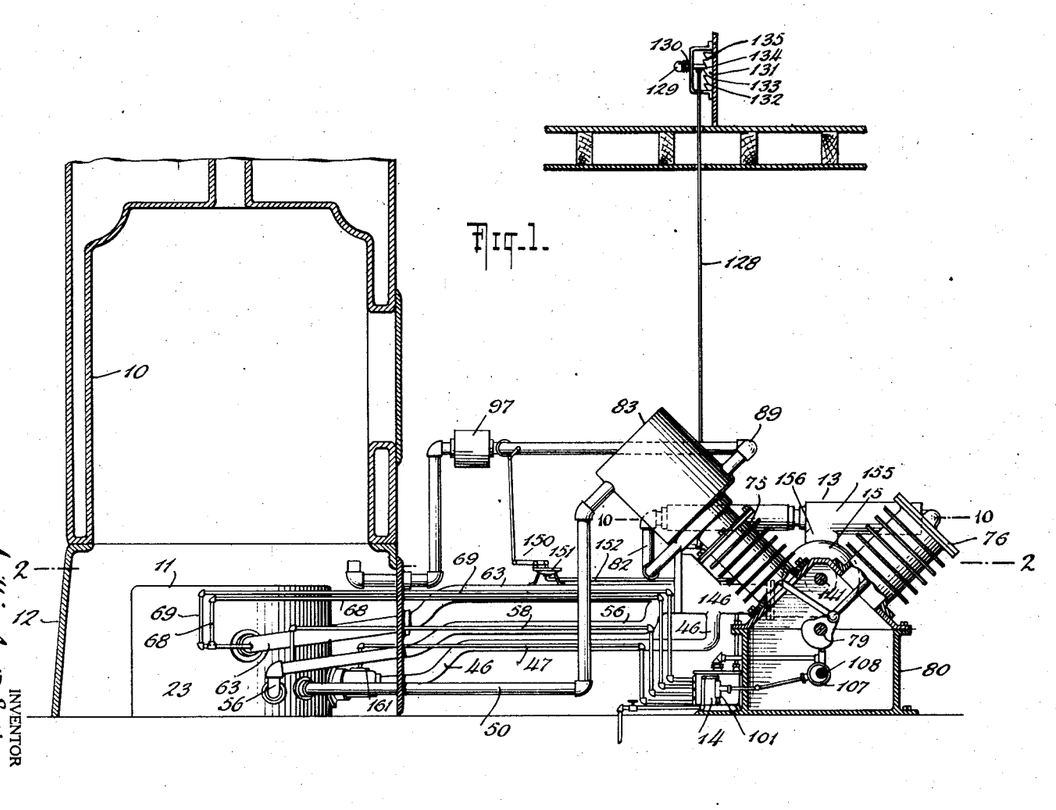
Fig. 1 is a side elevation of the system showing the furnace casing and the crank case of the engine broken away.

A feature of the invention consists in utilizing heat remaining in the gases which have passed through the heater 83 for furnishing a supply of hot water. For this purpose, a casing 97 is inserted in the pipe 89 and in this casing is a coil 98 through which water to be heated is circulated. The ends of the coil may be connected to an ordinary hot water storage tank, not shown in the drawings.

Figures 8, 9, 10, 11:
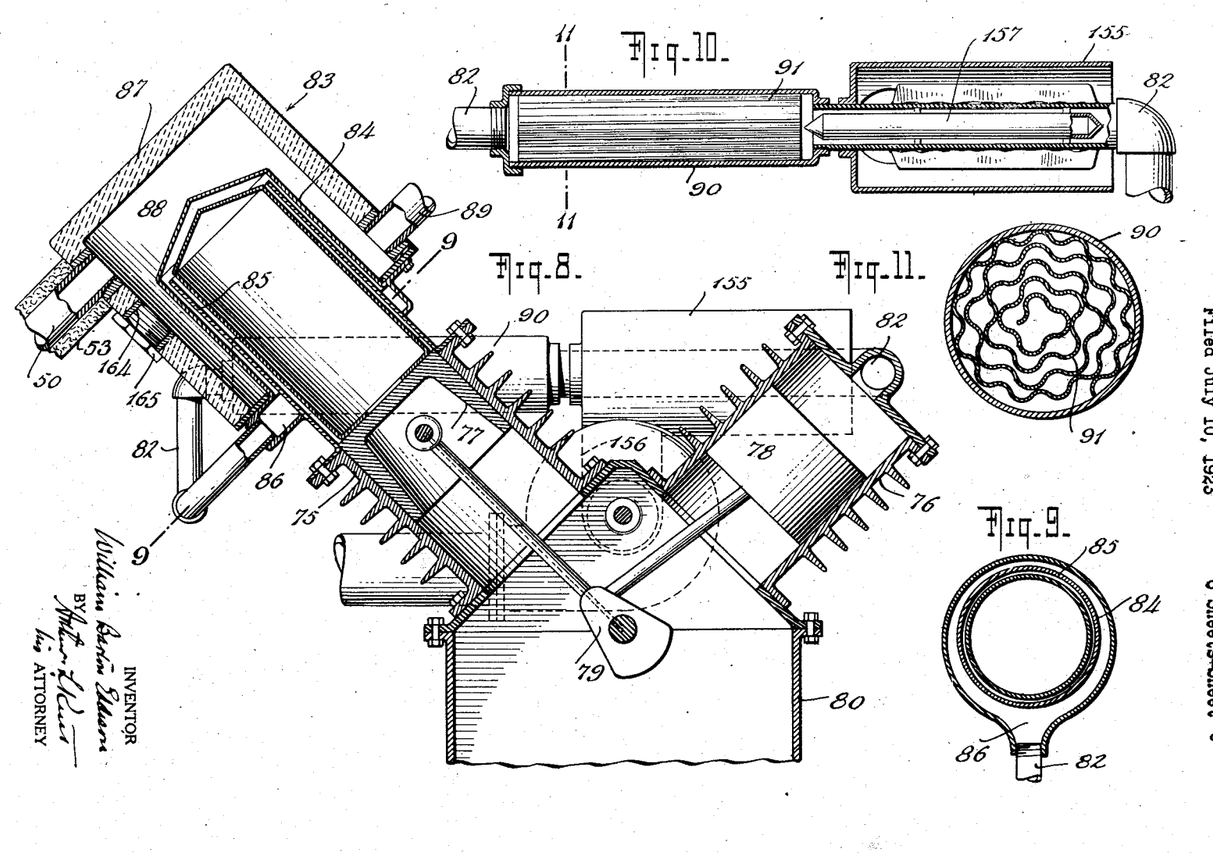
Fig. 8 is an enlarged horizontal section of the cylinders of the engine taken on the line 8—8 of Fig. 2.
Fig. 9 is a transverse section of the cylinder of the engine taken on the line 9—9 of Fig. 8.
Fig. 10 is a top view of the heat exchanger and cooler of the engine sectioned on the line 10—10 of Fig. 1.
Fig. 11 is a transverse section of the heat exchanger taken on the line 11—11 of Fig. 10.

A heat exchanger 90 is inserted in the conduit 82 which connects the hot and cold cylinders. Within the heat exchanger is a roll or spiral 91 of thin corrugated sheet metal which absorbs heat from the hot air and gives up this heat to the cold air.

In order to enable the hot air engine to operate for long periods without attention, it is provided with a force feed lubrication system. A gear pump 93 operated through a pinion 94 and a gear 95 from the main shaft 81 of the engine draws lubricating oil from the bottom of the crank case 80 and forces it through oil passages 96 into the bearings of the main shaft and the bearings of the connecting rods, from which it drops to the walls of the cylinders so as to lubricate the pistons 77 and 78.

The positive pumping apparatus 14 is driven by the engine 13 to supply fuel to the burner 11. This apparatus includes a plunger pump 101 which draws fuel from a main supply tank located below the level of the burner 11 and forces this fuel into a small auxiliary reservoir 102. The fuel is drawn from the supply tank through a pipe 103 containing a valve 104 and any overflow from the reservoir 102 returns to the supply tank through a pipe 105. The plunger rod 106 of the pump 101 enters the crank case 80 of the engine 13 and is reciprocated by means of an eccentric 107, fixed on a shaft 108 which is driven from the main crank shaft 81 of the engine through the pinion 94 and the gear 95.

Four gear pumps 111, 112, 113, 114 having a common body 115 are located in the reservoir 102. The body 115 is spaced from the bottom of the reservoir by feet 116. Each of the four pumps includes a gear fixed on a vertical shaft 117 which projects through the cover 118 of the reservoir 102. The shaft 117 is continuously driven by the engine through a spiral gear 119 fixed on the shaft 108 and engaging a gear 120 fixed on a horizontal shaft 121 which projects through the crank case 80 and has at its outer end a bevel gear 122 engaging a bevel gear 123 fixed on the shaft 117.

The pipes 47, 58, 68 and 69, through which fuel is supplied to the burner 11 for the four stages of combustion, enter the reservoir 102 and communicate respectively with the discharge openings of the four gear pumps 111, 112, 113 and 114. The inlet openings of the four gear pumps communicate with a vertical passage 124 formed in the body 115. Within the passage 124 is a plunger valve 125 which may be positioned to prevent the flow of fuel into the gear pumps 112, 113 and 114 but not the flow of fuel into the gear pump 111. The plunger 125 may be moved in the passage 124 by means of a rod 126 which extends through the cover 118 and is connected at its upper end to a horizontal lever 127 to which a control rod 128 is also connected. The control rod 128 may extend up to any desired part of the house heated by the system. It has at its upper end a handle 129 by means of which it may be moved up or down. The handle 129 is urged by a spring 130 against a fixed rack 131 containing four notches 132, 133, 134, 135 so that the control rod 128 may be given a step by step adjustment.

Since the engine 13 is caused to run at a uniform speed by a governor hereinafter described, the four gear pumps operate at a uniform speed, and, as a result, fuel is forced into the pipe 47 at a uniform predetermined rate, and may be forced into the pipes 58, 68, 69 at predetermined uniform rates by positioning the plunger valve 125 to uncover the intake openings of the gear pumps 112, 113, 114.

The blower 15 is driven by the engine 13 and furnishes air to the burner 11 for the four stages of combustion. The rotor 140 of the blower is mounted on a shaft 141 which extends into the crank case 80 of the engine, and is driven from the main shaft 81 through a gear 142 and a pinion 143. The discharge opening 144 of the casing 145 of the blower 15 communicates with an air box 146. The pipe 46, which supplies air for the first stage of combustion in the burner 11, communicates with the air box 146 at the bottom thereof. The pipe 56, which supplies air for the second stage of combustion, and the pipe 63, which supplies air for the third and fourth stages of combustion, communicate with the air box 146 at one end thereof. A damper 147 at this end of the air box 146 provides means for closing the intake ends of the pipes 56 and 63. The damper 147 projects through a slot in the top of the air box 146 and is connected to the lever 127 so that it may be operated by the control rod 128. The damper 147 is therefore operated simultaneously with the plunger valve 125. The controlling mechanism is so arranged that when the handle 129 is placed in the notch 132, the plunger valve 125 is positioned to admit fuel only to the pump 111, and the damper 147 closes the intake openings of the pipes 56 and 63, allowing air to pass from the box 146 only into the pipe 46. When the handle 129 is brought into the second notch 133, the plunger valve 125 is raised to uncover the inlet of the pump 112, and at the same time the damper 147 is raised sufficiently to uncover the inlet end of the pipe 56. This is the position of the parts shown in Figs. 7 and 13. When the handle 129 is placed in the third notch 134, the plunger 125 uncovers the inlet opening of the pump 113, while the damper 147 uncovers approximately one-half of the inlet end of the pipe 63. When the handle 129 is placed in the fourth notch 135, the plunger 125 is raised so as to uncover the inlets of all four of the pumps, while the damper is raised so as completely to uncover the inlet end of the pipe 63.

As the damper 147 opens the intake ends of the pipes 56 and 63, it closes a by-pass opening 148 in the wall of the air box 146, so that when the damper is raised to its highest position all the air discharged by the blower passes into the burner 11. When the damper 147 is moved down to close the pipe 63 and the pipe 56, it progressively uncovers the opening 148, so that the air forced through the blower 15 is substantially uniform in all positions of the damper.

Since the engine 13 operates at a uniform speed so as to maintain a uniform pressure in the air box 146, air is forced into the pipe 46 and through the nozzle 44 at a uniform rate. By properly positioning the damper 147, air may be forced into the pipe 56 at a uniform rate, and air may be forced into the pipe 63 at either of two uniform rates.

The size and speed of the gear pumps 111, 112, 113 and 114 is so proportioned to the size and speed of the blower 15 and the size of the air passages and nozzles that, at each stage of combustion in the burner, the rates at which fuel and air are supplied to the burner bear a fixed ratio to each other. This ratio is so fixed that the air supplied to the burner at each stage of combustion is only slightly in excess of the amount theoretically necessary to support the combustion of the fuel supplied to the burner at that stage of combustion.

The blower 15 serves as a governor and maintains the engine speed approximately uniform, owing to the fact that the power consumed in the blower is proportional to the cube of the speed of its rotor. If desired, however, the speed of the engine may be maintained more exactly uniform by means of an automatic governor 150. This governor controls the supply of heat to the heater 83 of the engine is such manner as to maintain the speed of the engine and the air pressure in the air box 146 substantially constant. The pressure in the air box is applied to a pressure controlled operating device 151 through a small pipe 152, and the device 151 operates a damper 153 in the pipe 89 in such manner as to cut down the circulation of hot gases in the heater 83 when the pressure in the air box 146 rises above the desired amount, and to permit an increased circulation through the heater 83 when the pressure in the air box falls below this amount.

The efficiency of the engine 13 may be increased by utilizing the current of air drawn in by the blower 15 to cool the air which surges between the hot and cold cylinders of the engine just before its entry into the cold cylinder. For this purpose the part of the conduit 82 which is next to the cold cylinder 76 may be enclosed by a casing 155 which is open at one end and connected at its other end to the intake opening of the casing 145 of the blower by means of a conduit 156. The cooling action may be further increased by forming external ribs on the portion of the conduit 82 within the casing 155, and by placing a torpedo-shaped baffle 157 in this portion of the conduit so as to cause the surging air to pass through this part of the conduit 82 in a thin stream adjacent to the wall of the conduit which is cooled by the air drawn into the blower.

The use of the system which has been described is as follows:—The system may be placed in operation in the Fall, or whenever heat is first required, by placing some liquid fuel in the primary combustion space 41, for example, by means of a swab inserted through an opening 160 provided for this purpose. The fuel on the swab is ignited and the hole 160 is then closed by a cover 161. The valve 104 in the fuel supply pipe 103 is then opened, the control handle 129 is placed in the lowest notch 132, and the engine 13 is turned over by means of a starting crank 162. This manual turning of the engine results in pumping fuel into the primary furnace 20 and in blowing air into this furnace. The hot products of combustion from the primary combustion space pass through the passage 49 and the pipe 50 to the heater 83. As soon as these gases have heated the heater 83 sufficiently to cause automatic operation of the engine 13, manual turning of the crank 162 is discontinued. The initial heating of the heater may be facilitated by inserting a plumber's torch through an opening 164 of the heater after removing the plug 165 by which this opening is normally closed.

The heat engine will then continue to operate and supply fuel and air to the primary combustion space 41, so that combustion will continue in this space as long as heat may be required, for example, all winter. The heat generated in the primary combustion space 41 is sufficient to operate the engine 13 to keep a part of the wall of the secondary combustion space 30 above the ignition temperature of the fuel, and to furnish a little heat to the boiler 10. The amount of fuel which must be consumed to furnish such heat is very small and may amount to not more than one pint an hour, as the horse-power of the engine 13 may be less than $\frac{1}{20}$th.

Whenever more than a minimum amount of heat is required in the house, the control handle 129 is raised one notch at a time to raise the plunger valve 125 and the damper 147 so that fuel and air are supplied successively to the secondary combustion space 30 and the tertiary combustion space 32 for the second, third and fourth stages of combustion. The fuel supplied for each successive stage of combustion is immediately vaporized and ignited by heat supplied from the previous stage of combustion. By properly positioning the control handle 129, any desired amount of heat may be furnished to the house, from the minimum furnished by the combustion in the primary space 41 to the maximum furnished by full capacity combustion in the primary, secondary and tertiary spaces.

When no further heat is required, for example, in the Spring, the valve 104 in the fuel supply pipe 103 is closed, thus extinguishing the fire in the burner 11 and, in consequence, stopping the engine 13.

It is often desirable, however, to operate the primary burner all summer in order that hot water may be supplied from the coil 98. This is because the cost of the fuel necessary to operate the primary burner and thus to produce heat enough to run the engine 13 and to heat the coil 98 is less than the cost of the gas required by an ordinary gas-burning hot water heater.

The system is absolutely safe, as at no time can excess fuel flow into the fire pot. When combustion is taking place in the primary space 41, any fuel supplied to the secondary or tertiary combustion space is immediately vaporized and ignited by the heat generated in the primary combustion space 41, so that no fuel can accumulate in the burner while combustion is taking place in the primary combustion space 41. Furthermore, if, for any reason, the flame in the primary combustion space 41 is accidentally extinguished, the heater 83 immediately cools and the operation of the engine 13 ceases, so that no more fuel is pumped into the burner. So far as the cutting off of the fuel supply on the extinction of the flame in the primary combustion space 41 is concerned, therefore, the system is intrinsically automatic. It dispenses with the necessity of the complicated and often uncertain cut-off devices which have heretofore been used in connection with domestic oil burners.

The system is economical. Owing to the proportioning of the rate of fuel supplied to each combustion space, and to the restricted outlets of the combustion spaces, the fuel supplied to each space is thoroughly vaporized and mixed with the air in the space to which it is supplied. Such mixing is facilitated by the whirling of the fuel vapor and air in the spaces 30 and 32, caused by the tangential introduction of the air. Consequently, complete smokeless combustion may be obtained with the use of very little more air than is theoretically required to support combustion of the fuel. The loss of heat caused by an excess supply of air in most oil burners is, therefore, eliminated. The heat absorbed in the hot air engine is very slight and the gases which are withdrawn from the primary furnace to heat the heater 83 are turned to the fire box through the pipe 89, so that all the heat remaining in them is utilized to heat the boiler 10.

The fact that no natural draft is used, coupled with the continuous combustion in the primary combustion space, eliminates the wastage involved in the cooling of the boiler by natural draft which takes place in intermittently operated oil furnaces.

The system makes it possible to heat up the house rapidly whenever required, for example, in the morning. This is because the boiler is not cooled by natural draft during the night, but, on the contrary, is always kept warm by the heat generated in the primary combustion space 41, and because the heat from this combustion space keeps a part of the wall of the secondary combustion space 30 so hot that immediate efficient and smokeless combustion may be obtained in the secondary combustion space whenever the control lever 129 is raised to the second notch; and soon after the second stage of combustion has been placed in operation the third and fourth stages may be brought into operation as required.

The heating system which has been described is a practical embodiment of my invention. I wish it clearly understood, however, that the invention is by no means limited to the particular apparatus used in this illustrative system. Thus, for example, the control rod 128 need not be moved manually, but may be moved by any known form of thermostatic controlling mechanism, or by clockwork. The boiler 10 may be replaced by apparatus for hot air house heating. The invention is, however, not limited to a system for house heating, as it may be used for furnishing heat for any purpose.

While all the parts of the system which has been described cooperate in obtaining the advantages above described, it is apparent that under some circumstances various features of the system may be used advantageously independently of other parts of the system with which they are combined in the embodiment illustrated.

What is claimed is:—

1. The combination with a burner for supplying heat to heat-utilizing means, of a heat engine operable by a minor portion of the heat generated in full capacity operation of the burner, means for diverting from the heat-utilizing apparatus a portion of the heat generated in the burner sufficient to operate the engine, a positive pump operated by the engine for supplying liquid fuel to the burner, and a blower operated by the engine for forcing into the burner air sufficient to support the combustion of the fuel.

2. The combination with a burner for supplying heat to heat-utilizing means, of a heat engine operable by a minor portion of the heat generated in full capacity operation of the burner, means for diverting from the heat-utilizing means a portion of the heat generated in the burner sufficient to operate the engine, and means operated by the engine for supplying liquid fuel and air to the burner.

3. The combination with a burner for supplying heat to heat-utilizing means, of a heat engine operable by a minor portion of the heat generated in full capacity operation of the burner, means for diverting from the heat-utilizing means a portion of the heat generated in the burner and utilizing said heat to operate the engine, governing means for regulating the amount of heat so diverted to maintain the speed of the engine constant, means operated by the engine for supplying liquid fuel and air to the burner, and controlling means simultaneously varying the rate of fuel supply and the rate of air supply.

4. The combination of a burner comprising communicating primary and secondary combustion spaces, a heat engine operated by heat generated in the primary combustion space, means operated by said engine for supplying fuel to the primary combustion space, and means operable by said engine for supplying fuel to the secondary combustion space.

5. The combination of a burner comprising communicating primary and secondary combustion spaces, a heat engine, means for conducting hot products of combustion produced in the primary combustion space to the heat engine to operate the same, means operated by the engine for supplying fuel to the primary combustion space, and means operable by the engine for supplying fuel to the secondary combustion space.

6. The combination of a burner comprising a series of combustion spaces communicating with each other through restricted passages, means for supplying liquid fuel and air to each of said combustion spaces at proportioned rates, a heat engine driving said supplying means, means for directing a portion of the heat generated in the first of said combustion spaces to the engine to operate it, and controlling means for cutting off the supply of fuel and air to the other combustion spaces successively.

7. The combination of a burner comprising a series of combustion spaces communicating though restricted passages, separate positive pumps adapted to supply liquid fuel to said combustion spaces respectively at predetermined rates, a heat engine for driving said pumps, means for directing a portion of the heat generated in the first of said series of combustion spaces to the engine to operate it, and controlling means for successively rendering inoperative the pumps supplying the other combustion spaces.

8. The combination of a burner comprising a series of combustion spaces communicating through restricted passages, separate positive pumps adapted to supply liquid fuel to said combustion spaces respectively at predetermined rates, a blower, air conduits leading from said blower to said combustion spaces respectively, a heat engine for driving said pumps and blower, means for directing a portion of the heat generated in the first of said combustion spaces to the engine to operate it, and controlling means arranged to render successively inoperative the pumps supplying the other combustion spaces and simultaneously to close the air conduits leading to said combustion spaces.

9. The combination of a burner comprising a series of combustion spaces communicating through restricted passages, separate positive pumps adapted to supply liquid fuel to said combustion spaces respectively, means for driving said pumps at a constant rate, and controlling means for successively rendering inoperative the pump supplying each of said combustion spaces except the first one of the series.

10. The combination with a burner for supplying heat to heat-utilizing means, of a heat engine operable by a minor portion of the heat generated in full capacity operation of the burner, means for diverting from the heat-utilizing apparatus a portion of the heat generated in the burner sufficient to operate the engine, a pump operated by the engine for supplying liquid fuel to the burner, and a blower operated by the engine for forcing into the burner air sufficient to support the combustion of the fuel.

In testimony whereof I have hereunto set my hand.

WILLIAM BARTON EDDISON.

CERTIFICATE OF CORRECTION.

Patent No. 1,687,549.                     Granted October 16, 1928, to

WILLIAM BARTON EDDISON.

It is hereby certified that error appears in the printed specification of the above numbered patent requiring correction as follows: Page 5, line 42, for the word "is" read "in", and line 104, before the word "supply" insert the word "to"; page 6, line 40, for the misspelled word "inrinsically" read "intrinsically", and line 64, for the word "turned" read "returned"; and that the said Letters Patent should be read with these corrections therein that the same may conform to the record of the case in the Patent Office.

Signed and sealed this 11th day of December, A. D. 1928.

(Seal)

M. J. Moore,
Acting Commissioner of Patents.